United States Patent
Elrod et al.

(10) Patent No.: US 7,147,763 B2
(45) Date of Patent: Dec. 12, 2006

(54) APPARATUS AND METHOD FOR USING ELECTROSTATIC FORCE TO CAUSE FLUID MOVEMENT

(75) Inventors: Scott A. Elrod, La Honda, CA (US); Eric Peeters, Fremont, CA (US); Francisco E. Torres, San Jose, CA (US); David K. Biegelsen, Portola Valley, CA (US); John L. Dunec, Palo Alto, CA (US); Alan G. Bell, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 329 days.

(21) Appl. No.: 10/115,336

(22) Filed: Apr. 1, 2002

(65) Prior Publication Data
US 2003/0183525 A1    Oct. 2, 2003

(51) Int. Cl.
*G01N 27/26* (2006.01)
(52) U.S. Cl. ............. 204/547; 204/643; 204/450; 204/600
(58) Field of Classification Search ............. 204/547, 204/643
See application file for complete search history.

(56) References Cited

U.S. PATENT DOCUMENTS

| | | | |
|---|---|---|---|
| 5,486,337 A | 1/1996 | Ohkawa | 422/100 |
| 5,814,200 A * | 9/1998 | Pethig et al. | 204/547 |
| 6,040,193 A | 3/2000 | Winkler et al. | 436/180 |
| 6,193,413 B1 * | 2/2001 | Lieberman | 374/45 |
| 6,261,431 B1 * | 7/2001 | Mathies et al. | 204/601 |
| 6,284,113 B1 | 9/2001 | Bjornson et al. | 204/453 |
| 6,294,063 B1 * | 9/2001 | Becker et al. | 204/450 |
| 6,319,469 B1 | 11/2001 | Mian et al. | 422/64 |
| 6,380,605 B1 | 4/2002 | Verhaegen | |
| 6,545,334 B1 | 4/2003 | Verhaegen | |
| 6,843,596 B1 | 1/2005 | Verhaegen | |
| 2003/0152128 A1 | 8/2003 | Verhaegen | |
| 2003/0186453 A1 * | 10/2003 | Bell et al. | 436/147 |
| 2003/0186455 A1 | 10/2003 | Bruce et al. | |
| 2003/0186464 A1 | 10/2003 | Bruce et al. | |
| 2004/0038227 A1 | 2/2004 | Verwaerde et al. | |
| 2004/0038228 A1 | 2/2004 | Verhaegen | |

FOREIGN PATENT DOCUMENTS

WO    WO 99/54730    10/1999

OTHER PUBLICATIONS

Pierce, M.M. et al, "Isothermal Titration Calorimetry of Protein-Protein Interactions." Methods. 19, 213-221. (1999).*
Masao Washizu, Electrostatic Actuation of Liquid Droplets for Microreactor Applicaitons, IEEE Transactions on Industry Applications, IEEE Inc. New York, vol. 34, No. 4 zJul. 1998, pp. 732-737.
Duke University, "Digital Microlfuldics", http://www.ee.duke.edu/Research/microfluidics/. Dec. 11, 2004, pp. 1-4.

* cited by examiner

*Primary Examiner*—Nam Nguyen
*Assistant Examiner*—Jeffrey Barton
(74) *Attorney, Agent, or Firm*—Linda M. Robb; Daniel B. Curtis (57) ABSTRACT

A device for effecting motion of liquid droplets on a surface through the use of electrostatic field force includes a single substrate on which are disposed a plurality of spaced-apart electrodes. A dielectric material surrounds the electrodes on the substrate. The surface on which the liquid droplets are deposited is fabricated from a material that facilitates motion of the liquid droplets.

15 Claims, 9 Drawing Sheets

APPARATUS AND METHOD FOR USING ELECTROSTATIC FORCE TO CAUSE FLUID MOVEMENT

CROSS REFERENCE TO RELATED APPLICATIONS

The following copending application, U.S. application Ser. No. 10/114,611 filed Apr. 1, 2002, titled "Apparatus and Method for a Nanocalorimeter for Detecting Chemical Reactions", is assigned to the same assignee of the present application. The entire disclosure of this copending application is totally incorporated herein by reference in its entirety.

INCORPORATION BY REFERENCE

The following U.S. patents are fully incorporated herein by reference: U.S. Pat. No. 6,040,193 to Winkler et al. ("Combinatorial Strategies for Polymer Synthesis"); U.S. Pat. No. 6,284,113 to Bjornson et al. ("Apparatus and Method for Transferring Liquids"); and U.S. Pat. No. 6,319,469 to Mian et al. ("Devices and Methods for Using Centripetal Acceleration to Drive Fluid Movement in a Microfluidics System").

BACKGROUND OF THE INVENTION

This invention relates generally to miniaturized genetic, biochemical and chemical processes related to analysis, synthesis and purification procedures. Specifically, the invention provides an apparatus and method for moving liquid droplets across a surface through the use of electrostatic activation with no moving parts other than the liquid droplets themselves.

It must be appreciated that the present invention may have utility in any situation where controlled motion and/or deformation of liquid droplets is needed. One example is merging of two droplets into one. This example is especially advantageous for facilitating chemical reactions or mixtures between fluids of small volume. Examples of fluids are liquids, liquid solutions and emulsions, particulate solid-liquid emulsions and particulate solid-liquid suspensions. The small-volume fluid moving capability of the present invention enables small device size and therefore enables large-number arrays of drop movers for massively parallel handling of droplets, as required for combinatorial approaches to material discovery or synthesis. Combinatorial chemistry is suitable for material discovery or synthesis in a number of fields and industries, but especially in bioscience. It has become increasingly desirable in recent years to develop capabilities for rapidly and reliably carrying out chemical and biochemical reactions in large numbers using small quantities of samples and reagents. For example, pharmaceutical researchers as well as chemical, bioscience, and biomedical researchers have turned to massively parallel screening of combinatorial libraries as sources of new lead compounds for drug discovery. A combinatorial library is a collection of chemical compounds, which have been generated, by either chemical synthesis or biological synthesis, by combining a number of chemical "building blocks" as reagents. For example, a combinatorial polypeptide library is formed by combining a set of amino acids in every possible way for a given compound length (i.e., the number of amino acids in a polypeptide compound). Millions of chemical compounds can theoretically be synthesized through such combinatorial mixing of chemical building blocks.

Once a library has been constructed, it must be screened to identify compounds which possess some kind of biological or pharmacological activity. Through the years, the pharmaceutical industry has increasingly relied on high throughput screening (HTS) of libraries of chemical compounds to find drug candidates. HTS describes a method where many discrete compounds are tested in parallel so that large numbers of test compounds are screened for biological activity simultaneously or nearly simultaneously. Currently, the most widely established techniques utilize 96-well microtitre plates. In this format, 96 independent tests are performed simultaneously on a single 8 cm×12 cm plastic plate that contains 96 reaction wells. These wells typically require assay volumes that range from 50 to 500 µl. In addition to the plates, many instruments, materials, pipettors, robotics, plate washers and plate readers are commercially available to fit the 96-well format to a wide range of homogeneous and heterogeneous assays. Recently, the microtiter plate approach has been extended to 384 and 1536 well formats. However, there is a point at which the cost in miniaturization of plates and redesign of associated equipment has inherent costs and complexities that limit such an approach to miniaturization.

The following disclosures may be relevant and/or helpful in providing an understanding of some aspect of the present invention:

U.S. Pat. No. 6,040,193 to Winkler et al., ("Combinatorial Strategies for Polymer Synthesis") teaches a series of channels, grooves, or spots are formed on or adjacent a substrate. Reagents are selectively flowed through or deposited in the channels, grooves, or spots, forming an array having different compounds at selected locations on the substrate.

U.S. Pat. No. 6,284,113 to Bjornson et al., ("Apparatus and Method for Transferring Liquids") discloses a transfer plate having a plurality of apertures, which act as transfer elements. Each aperture is capable of being electrically activated. The transfer plate is attached to a multiwell plate to form a sealed system except for the apertures of the transfer elements. The transfer plate is adapted for simultaneously transferring precise amounts of a liquid from the multiwell plate to a sample receiving plate by electrically activating the apertures in the transfer plate.

U.S. Pat. No. 6,319,469 to Mian et al., ("Devices and Methods for Using Centripetal Acceleration to Drive Fluid Movement in a Microfluidics System") teaches a system comprising a combination of two elements, a rotatable micro-platform and a micro-manipulation device. The micro-platform is preferably a disk that includes sample, inlet ports, fluid micro-channels, reagent reservoirs, reaction chambers, detection chambers, fluid inlet ports, air outlet ports, air displacement channels, and sample outlet ports. The disk is rotated at speeds from about 1–30,000 rpm to generate centripetal acceleration that enables fluid movement. The inlet ports allow samples to enter the disk for processing and/or analysis. The air outlet ports and the air displacement ports provide a means for fluids to displace air, thus ensuring uninhibited movement of fluids on the disk. Specific sites on the disk also preferably comprise elements that allow fluids to be analyzed, including thermal sources, light sources, and acoustic sources, as well as detectors for each of these effectors.

SUMMARY OF THE INVENTION

Briefly stated, and in accordance with one aspect of the present invention, there is disclosed a device for effecting motion of liquid droplets on a surface through the use of electrostatic field force. The device includes a single substrate on which are disposed a plurality of spaced-apart electrodes. A dielectric material surrounds the electrodes on the substrate. The surface on which the liquid droplets are deposited is fabricated from a material that facilitates motion of the liquid droplets.

In another aspect of the present invention, there is disclosed a method for effecting motion of liquid droplets on a surface of a device having a single substrate and a plurality of electrodes spaced apart from one another on the substrate. A dielectric layer is disposed on the substrate and the electrodes. The surface of the dielectric layer includes a suitable material for facilitating motion of the liquid droplets. After the deposition of not less than one droplet on the surface, a voltage is applied between at least two of the electrodes to cause movement of the droplet.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION DEFINITIONS

As used herein, the term "screening" refers to the testing of a multiplicity of molecules or compounds for their ability to bind to a target molecule.

As used herein, the term "sample" refers to any chemical or particulate species of interest, either isolated or detected as a constituent of a more complex mixture, or synthesized from precursor species.

As used herein, the term "substrate" refers to a material having a rigid or semi-rigid or flexible surface. In many of the embodiments, at least one surface of the substrate will be substantially flat, although in some embodiments it may be desirable to physically separate synthesis regions for different samples with, for example, wells, raised regions, etched trenches, or the like. In some embodiments, the substrate itself may contain wells, trenches, flow through regions, porous solid regions, etc., which form all or part of the synthesis regions.

As used herein, the term "array" refers to an arrangement of a plurality of elements such as a plurality of electrode structures on a multi-assay card, a plurality of test regions on a substrate, etc.

As used herein, the term "planar array" refers to an array that is arranged in a plane, which may be the plane of an object such as, for example, a planar substrate, comprising the array.

As used herein, the term "microfluidic" means of or pertaining to fluids and being of a magnitude on the order consistent with capillary dimension.

As used herein, the term "microfluidic processing" refers to processing carried out on a microfluidic scale. The processing involves fluid handling, transport and manipulation consistent with chambers, channels, or surfaces of capillary dimension.

As used herein, the term "electrical activation" refers to activation that is electrodynamically driven, including electrostatic activation, piezoelectric activation, and the like.

As used herein, the term "electroconductive material" refers to material that is capable of transporting an electrical stimulus. Examples of such material are metals such as, e.g., nickel, copper, gold, silver, platinum, rhodium, palladium, and the like and alloys thereof such as, e.g., gold-copper alloy, palladium-nickel alloy, stainless steel, and so forth. Other examples are ion conductors such as aqeous solutions, saline solutions, aqueous suspensions of biological molecules and other materials containing mobile ions.

As used herein, the term "planar surface" refers to a generally two-dimensional structure on a solid substrate, which is usually, but not necessarily, rigid and not necessarily flat. The surface may be composed of any of a wide variety of materials, for example, polymers, plastics, resins, polysaccharides, silica or silica-based materials, carbon, metals, inorganic glasses, membranes, etc. The surface may be non-reactive to the liquid deposited thereon or it may contain reactive functionalities for binding to a component of the liquid. On the other hand, the surface may contain one or more reagents for conducting a chemical synthesis or analysis. The substrate upon which the surface lies may have any convenient shape such as disk, square, and the like. Where the substrate is formed from a different material than the surface, the substrate may be formed from glass, modified silicon, polymeric material, or combinations thereof. Other substrate materials will be readily apparent to those skilled in the art upon review of this disclosure.

The invention can be used in a variety of applications. For example, the invention can be used to move one or more droplets or combine two or more droplets in a synthesis tool (as for example in peptide synthesis), in a screening tool (as for example in screening compound libraries for drug activity), or in a monitoring/diagnostic tool (as for example in medical or environmental testing). As another example, the present invention can be used to provide movement of one or more droplets into a porous or open solid in a synthesis tool, in a screening tool, or in a monitoring/diagnostic tool. The porous or open solid can either be passive or react or interact with the drops, depending on the application. In an embodiment, the pores of the solid are small enough to exert a capillary force on the liquid in the droplets sufficient to enhance the mass movement, reaction, or interaction. Combinations of the above are also included as part of this invention.

Figure 1:
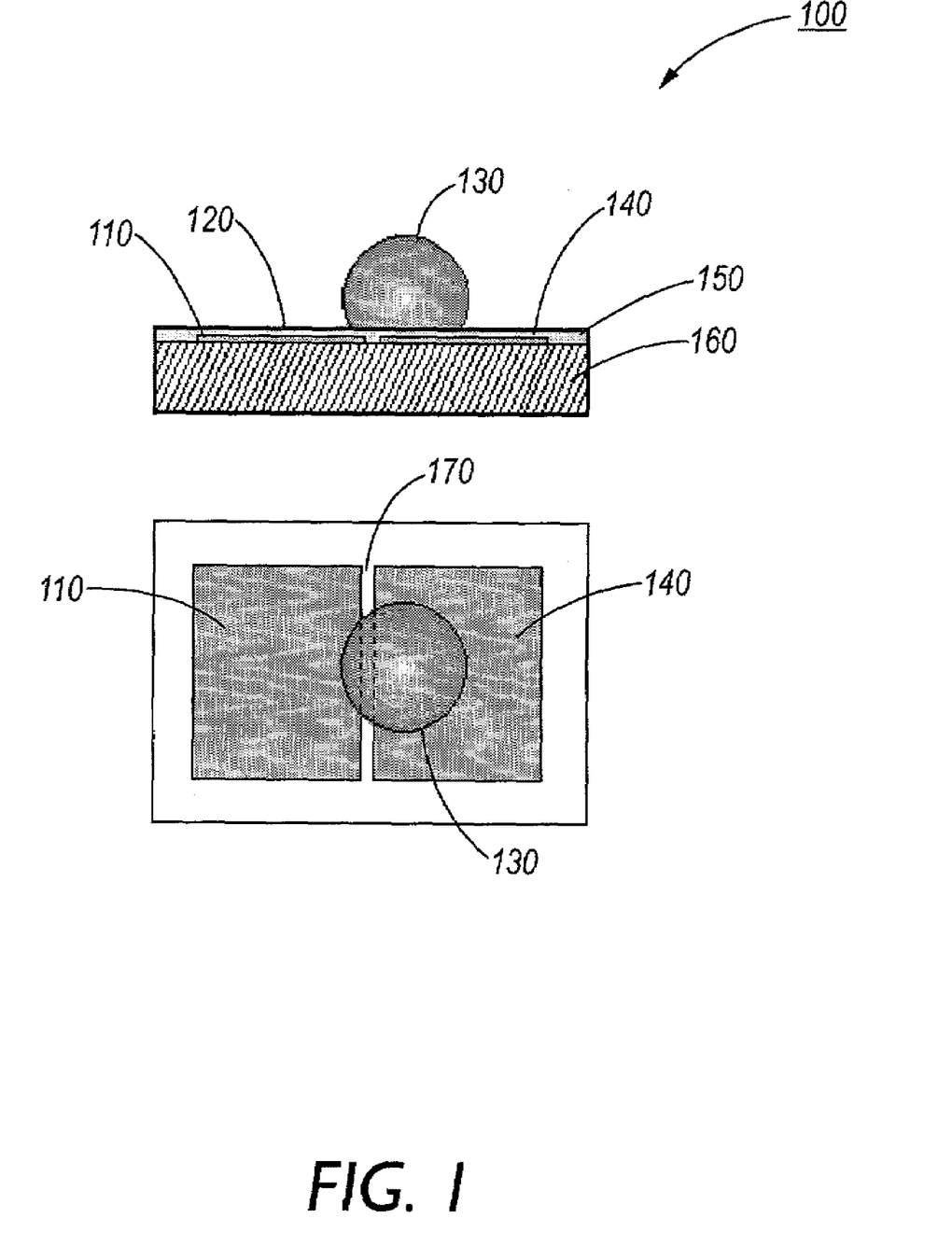
FIG. 1 illustrates a cross-section and plan view of the drop mover structure according to one embodiment of the present invention.

Referring now to FIG. 1, there is shown a cross-sectional view and a plan view of electrostatic drop mover 100 according to an example embodiment of the present invention. This example embodiment enables movement of drops of sample without introducing appreciable heat and also facilitates mixing of a plurality of sample types. Electrostatic drop mover 100 consists of a single substrate 160, on which reside at least two electrodes 110 and 140. Other drop mover art, as disclosed in the article "Electrowetting-based Actuation of Liquid Droplets for Microfluidic Applications" by Michael G. Pollacka and Richard B. Fairb (Applied Physics Letters, v. 77, No. 11, September, 2000), and the article "Enhancement of Mixing by Droplet-based Microfluidics" by Jesse Fowler, Hyejin Moon, and Chang-Jin "C J" Kim (Mechanical and Aerospace Engineering Dept., University of California Los Angeles, Los Angeles, Calif.), requires the presence of a second substrate with one or more electrodes on the opposing side of the droplets, effectively sandwiching droplets between two substrates. It must be appreciated that it is a key distinguishing feature of the present invention that it only requires a single substrate. This is advantageous for ease of fabrication, cost and for accessibility in use, such as during deposition of the drops, measuring a property of the drops and the like. Substrate 160 may be fabricated from various materials known in the art, for example, glass, plastic, or resin.

Figures 10, 11:
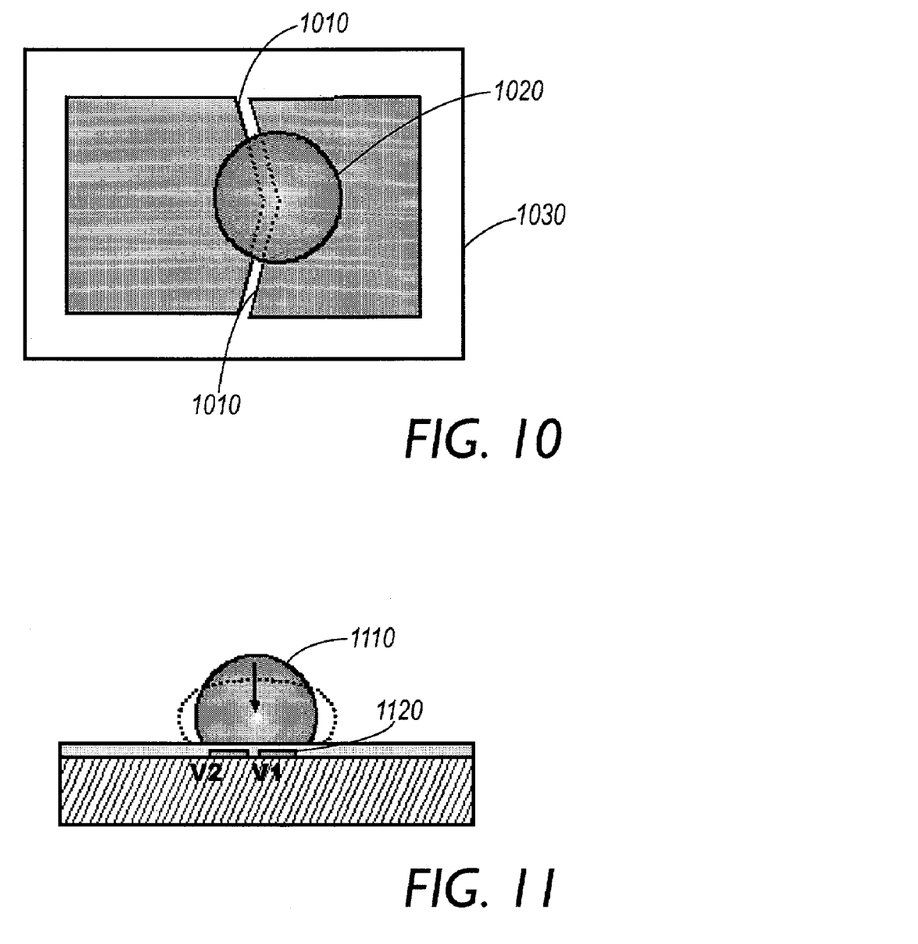
FIG. 10 illustrates another embodiment of the drop mover structure according to the present invention.
FIG. 11 illustrates the deformation of drops according to the present invention.

Although for the purposes of description herein, electrodes are illustrated as being rectangular in shape, one skilled in the art will appreciate that the electrodes and any gaps separating them may assume a variety of shapes and configurations, all of which are contemplated by the disclosure of the present invention. For example, FIG. 10 illustrates an embodiment having triangular electrode edges 1010. In embodiments, it might be preferred to place droplets 1020 over part of the gaps between electrodes, and shapes such as the one illustrated in FIG. 10 provide increased latitude for such placements. Specifically, the latitude for drop placements for which the drop spans part or all of the gap in FIG. 10 is of the order of the length from the base to the apex of the triangle comprising the two gap segments. In contrast, the comparable latitude for a linear gap is the gap width.

Electrodes 110 and 140 may be thin metal films patterned using any thin film deposition process known in the art. Electrodes 110 and 140 may range in size from approximately 10 micron to 5 mm on each side and are spaced apart from each other by gap 170, which may range in size from approximately 1 μm to approximately 500 μm. Electrodes 110 and 140 are encased with insulating/dielectric layer 150, which may range in thickness from about 0.1 μm to about 100 μm. Examples of suitable materials include silicon oxide, silicon nitride, silicon oxynitride, Tantalum Oxide or polymers such as Parylene, as Dupont Teflon AF, 3M Fluorad, 3M EGC 1700, other fluoropolymers, polysiloxanes, diamond-like carbon or other spin-coated, spray-coated, dip coated, or vapor deposited polymers. For embodiments where significant lateral motion along the substrate is desired, the surface 120 of the dielectric layer is preferably highly hydrophobic if the drops are aqueous-based and preferably highly oleophobic if the drops are oil based, to enhance the ease of motion of the drops along the surface. As an example, a hydrophobic surface may be achieved by using a hydrophobic dielectric layer (e.g. Parylene), or by depositing a hydrophobic layer on top of the dielectric layer. Suitable hydrophobic materials typically include Fluorocarbons such as Dupont Teflon AF, 3M Fluorad, 3M EGC 1700, other fluoropolymers, polysiloxanes, diamond-like carbon or vapor or plasma deposited fluorocarbons.

In order to move a liquid droplet in an embodiment of the present invention, droplet 130 is deposited on top of the hydrophobic surface in such a way as to bridge gap 170 asymmetrically, as shown in the plan view of FIG. 1. Drop 130 covers part of both electrodes, but a larger volume of the drop rests on one of the electrodes, in this example, electrode 140. When a sufficiently large voltage difference is applied between the two electrodes, electrostatic force causes droplet 130 to move across surface 120, striving to center droplet 130 across gap 170.

In general, the present invention provides an apparatus and method for moving liquid droplets across a surface through the use of electrostatic activation with no moving parts other than the liquid droplets themselves, while only requiring a single substrate. In practicing the present invention, embodiments may be chosen based on a preference for enhancing the effect of one or more mechanisms favorable for a particular application of interest, however, the present invention includes all embodiments and is not meant to be restricted by the example mechanisms discussed herein.

One such physical mechanism is based on the coulombic 'suction' of dielectric materials within a capacitor, e.g. a sheet of dielectric material movably and partially (i.e. offset in the plane of the plates) inserted in the gap of a parallel plate capacitor is pulled towards the center of the capacitor when voltage is applied. It is energetically favorable to have the maximum amount of dielectric material between the capacitor plates. Conversely, a laterally offset plate of an energized parallel plate capacitor will strive to move laterally in the direction that minimizes the offset. In this embodiment of the present invention, the movable material is liquid droplet 130, and the capacitor plates are locally substantially co-planar. In this case, the most energetically favorable configuration is achieved when droplet 130 is centered across gap 170.

Another physical mechanism acting in the case of aqueous solutions or other ionically conducting fluids is based on electric field induced migration of mobile ions towards the electrodes. The electrostatic energy reduction effectively lowers the interfacial force energy of the electrodes and thus changes the balance of surface tensions, and resultant contact angles. If the drop is positioned asymmetrically with respect to a set of activated electrodes, unbalanced forces create a net lateral force on the drop, pushing the drop towards the symmetric location.

Yet another physical mechanism suitable for deforming a droplet is based on electrostatic 'body force' acting on the dielectric fluid material in the presence of an electric field. For example, FIG. 11 illustrates a droplet 1110 resting on a set of energized electrodes 1120 and being flattened and spread under the influence of the electric field. With another droplet present in close proximity, drop merging ensues when the drop deformation exceeds the spacing between the drops.

Figure 12:
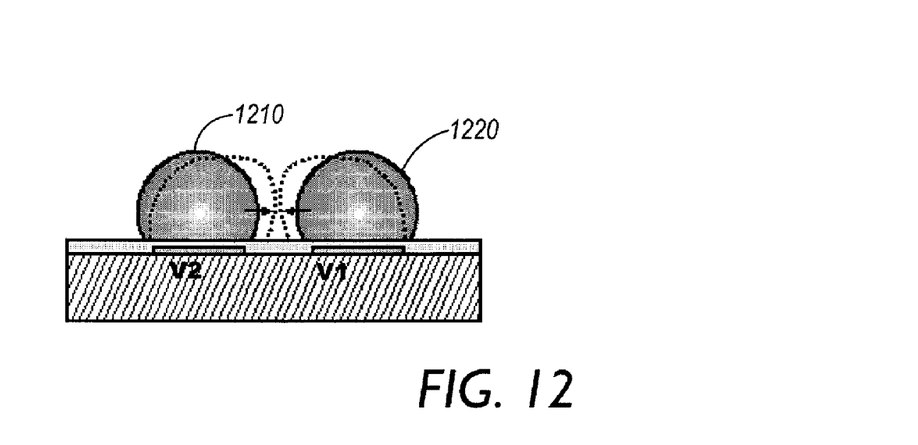
FIG. 12 illustrates the merging of two drops according to the present invention.

FIG. 12 illustrates yet another applicable physical mechanism for merging drops. It is based on direct electrostatic attraction between two closely spaced and oppositely ionically conducting or dielectric droplets 1210 and 1220. Due to ion migration, the sides of droplets 1210 and 1220 facing each other carry opposing charges and therefore attract each other, thus causing deformation of the droplets towards one another. If closely spaced, physical contact between the drops may ensue, effectively merging the two drops into one.

Any or all of the above mechanisms may play a concurrent role in the drop deformation and/or motion achieved in the various embodiments of the present invention. The essence of the current invention is to exploit any or all of these mechanisms using electrode configurations disposed on a single, preferably substantially planar substrate that supports the otherwise unconstrained droplets.

Figure 6:
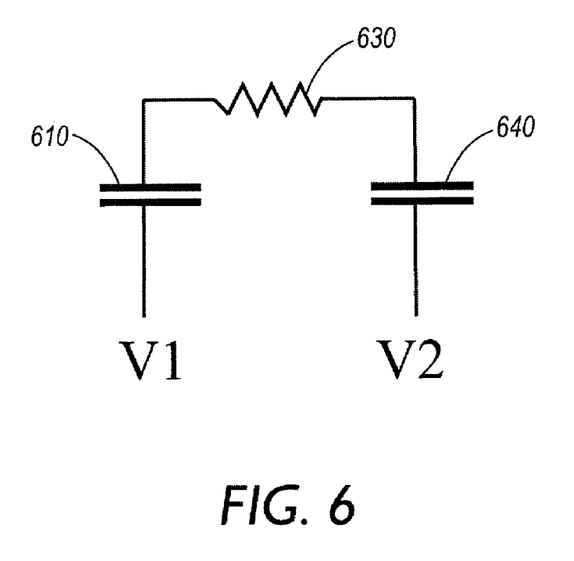
FIG. 6 is a circuit analog for one embodiment of the present invention.

Referring to FIG. 1 and the corresponding example embodiment, in the case in which $A_2$ is the area that drop 130 covers over electrode 110, and $A_1$ is the area that drop 130 covers over electrode 140, with drop 130 separated from electrodes 110 and 140 by insulator/dielectric 150, electrodes 110 and 140 correspond to two capacitors connected in series through the resistance of drop 130. An equivalent circuit diagram is shown in FIG. 6, in which 630 refers to the resistance of the drop, and 610 and 640 are capacitors connected in series. Both insulator 150 and the electric double layer in drop 130 will contribute to the capacitances at the two interfaces, but the contribution of insulator 150 dominates for insulator thicknesses greater than about 0.5 microns and ionic strengths comparable to those used in biological buffers, which may range from about $10^{-6}$ M to about $10^{-1}$ M. Although the following illustrative equations and calculations do not include the contribution to the capacitance of the electric double layer, the present invention is not limited to such cases, but embraces the contribution of all layers, surfaces, etc. present in any of numerous possible embodiments, as will be appreciated by one skilled in the art. Additionally, the present invention encompasses lower ionic strengths than those used in the various embodiments herein, for example, the ionic strength of deionized, pure water or other solvents, including nonpolar solvents or solvents less polar than water.

The total energy stored in the two capacitors 610 and 640 in FIG. 6 is $$U = \frac{1}{2}C_T V^2,$$

where U is the energy, $C_T$ is the equivalent capacitance of the circuit in FIG. 6, and V is the voltage. For two capacitors having areas $A_1$ and $A_2$, respectively, and capacitance per unit area of $\varepsilon\varepsilon_0/d,$ $\varepsilon$ being the dielectric constant of the insulator/dielectric layer, $\varepsilon_0$ being the permittivity of a vacuum, and d being the thickness of the insulator/dielectric layer, the equivalent capacitance of the two capacitors in series is $$C_T = \frac{\varepsilon\varepsilon_0 A_1 A_2}{d(A_1 + A_2)}.$$

Substituting $C_T$ into the equation for energy (U) yields the stored energy as a function of $A_1$ and $A_2$. Recognizing that the drop will move laterally upon application of an applied voltage to optimize its stored capacitive energy, an effective force can be derived as a function of lateral displacement by differentiating the energy U with respect to lateral displacement in the direction of motion. Doing so yields the equation for the effective force $$F(y) = \frac{2V^2 \varepsilon\varepsilon_0 R}{\pi d} f(y),$$

where $f(y) = y(1-y)(2-y) + \sqrt{y(2-y)} \sin^{-1}(1-y).$

In the above equation, R is the radius of the contact area between the drop and the insulator layer, $V=V_2-V_1$, and y is the distance that the drop has moved over electrode 2 divided by R. For this example, we have assumed the contact areas to be circular as an idealization to keep the numerical examples straightforward.

Figure 7:
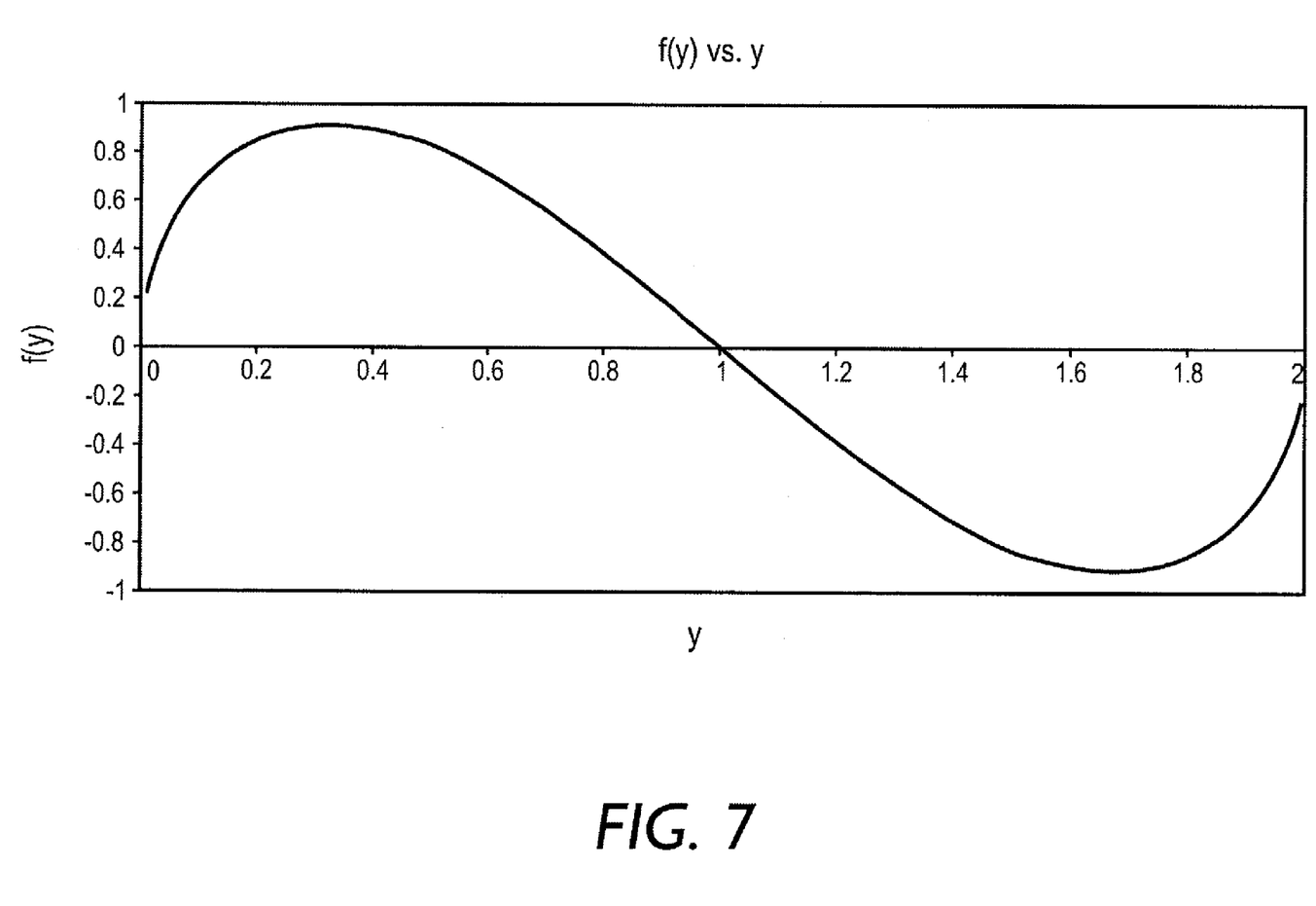
FIG. 7 is an estimate of the force on the drop as a function of the drop position relative to the electrode gap according to one embodiment of the present invention.

Referring now to FIG. 7, the behavior of f(y) is illustrated. The force rises quickly at small values of y and is strongest at around y=0.33, which at 33% of the radius is a rather small overlap. The force increases with increasing displacement at lower values of y, suggesting that the drop will move with increasing ease if motion starts at y<0.33. When y=1, the force drops to zero, as the two capacitors in series in FIG. 6 have been made equivalent to maximize the stored potential energy. If the drop moves further, then there is a restoring force that would try to push the drop back to the centered position (y=0), corresponding to f(y) becoming negative. However, if the drop momentum is large enough as y exceeds 1, the restoring force may not be large enough to prevent the drop from moving completely off electrode 1. Such motion might be advantageous in some embodiments while being undesirable in others.

For typical values of $\varepsilon$=3, R=360 microns, and d=1 micron, $$\alpha_F = \frac{F(y)}{V^2 f(y)} \approx 6 \text{ nN/V}^2,$$

which describes the calculated magnitude of the force created by the capacitance. The force must overcome the resistance to motion exerted on the drop at the three phase contact line. Usually that force is smaller for larger contact angles (e.g. angles greater than 90°) and larger for smaller contact angles. Predicting the force required for moving a drop in quantitative terms is affected by the shape of the drop, the roughness of the solid surface, surface inhomogeneities, and a number of other factors.

For illustrative purposes, some approximations can be made in order to illustrate typical magnitudes that may be expected for the voltage necessary to cause drop motion. For example, it may be assumed that the main resistance to motion is proportional to the surface tension $\gamma$ and the projection of the contact line falls along an axis perpendicular to the direction of motion, with the projection of the contact line being equal to 2R for a circular contact area. In this case, $2\gamma R$ may be set equal to $\alpha_F V^2$ to provide an order-of-magnitude estimate of the voltage needed to create drop movement with it then being possible to solve for V to obtain the following approximation of the voltage needed to move a drop:

$$V = \left(\frac{2\gamma R}{\alpha_F}\right)^{\frac{1}{2}} \approx 90 \text{ V},$$

where γ=72 mN/m (value for water at 25° C., chosen for illustrative purposes only) and the other values for relevant parameters are given above.

For some applications of drop motion, it is also necessary to consider the heat released during charging and discharging of the capacitances during drop movement. For the equivalent circuit shown in FIG. 6, for which the main resistance is in the drop itself, the drop will heat from $C_T V^2/2$ units of energy, which corresponds to a temperature rise of $$\Delta T = \frac{C_T V^2}{m c_P},$$

where m is the mass of the drop and $c_P$ is the specific heat. Using the above equation for $C_T$, the same values for the various parameters as before, and $A_1 = A_2 = \pi R^2/2$, and setting V=90V, $m=(2\pi R^3/3) \times 1$ g/cm$^3$, and $c_P$=4.18 J/g/° C., $\Delta T = 54 \times 10^{-6}$° C.

For some applications, such as microcalorimetry, this temperature rise might be undesirable, since it may be comparable to the signal of interest. In this case, common mode rejection with a reference sample may be used to address this problem.

Figure 8:
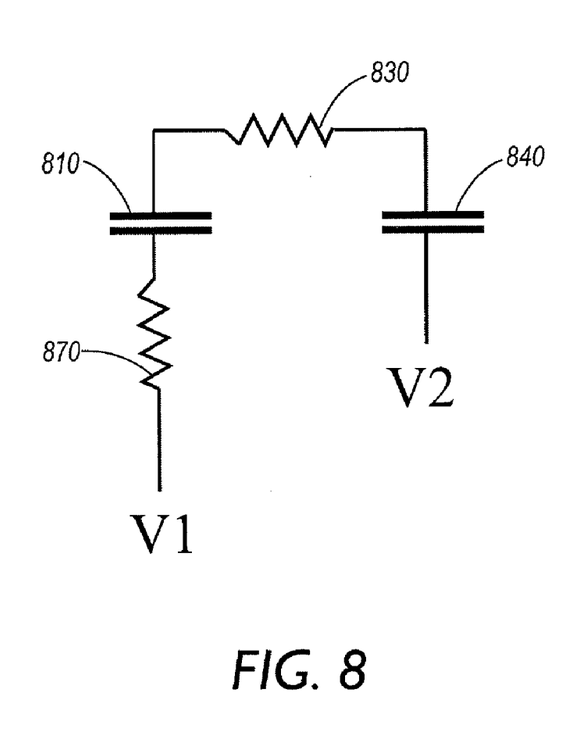
FIG. 8 is a circuit analog for another embodiment of the present invention.

Alternatively, a resistance could be added to FIG. 6 external to the drop, as is shown in FIG. 8. The capacitors 810 and 840 and drop resistance 830 ($R_{drop}$) correspond to the drop and drop moving electrodes as above, but in this case external resistor 870 ($R_{ext}$) has been added to the line delivering the voltage to one of the electrodes. For the case shown in FIG. 8, the value of $\Delta T$ in the drop due to drop motion by methods of this embodiment of the present invention is attenuated by a factor of $R_{drop}/(R_{drop}+R_{ext})$, so $R_{ext}$ can be chosen to be sufficiently large to reduce $\Delta T$ to an acceptable level. Other forms and methods of adding an external resistance may also be beneficially employed.

Figure 2:
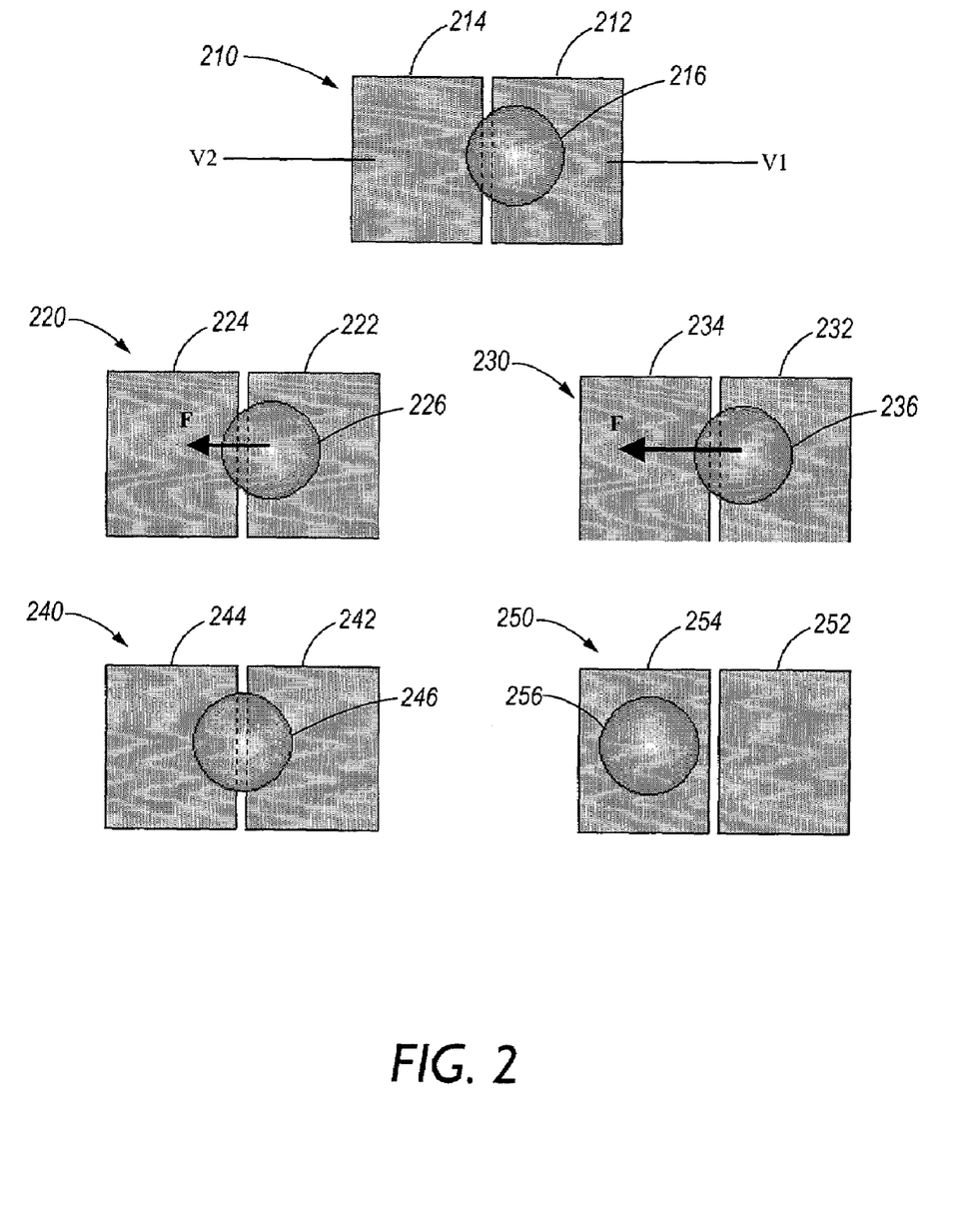
FIG. 2 illustrates drop motion on the drop mover structure according to one embodiment of the present invention.

Referring now to FIG. 2, in illustration 210 a drop 216 is shown in an asymmetric start position spanning the surface of electrodes 212 and 214. In moving the drop initially, it is necessary to overcome static friction, caused by surface tension forces, of the droplet on the surface of the electrodes. For example, depending on drop size, liquid material type, surface quality, and dielectric layer material and thickness, a minimum voltage may range from approximately 5 V to approximately 1000 V. At position 220, a small voltage pulse is applied to drop 226 residing on the surface of electrodes 222 and 224. This voltage pulse, sufficient to overcome static friction, causes drop 246 to move to an equilibrium position on the surface above electrodes 242 and 244. When a DC voltage sufficiently above the threshold is applied, the droplet typically achieves the equilibrium position. Alternatively, equilibrium is also achieved when a voltage pulse with an amplitude above the threshold level but below the overshoot threshold level is applied. In this example the pulse may range from approximately 5 ms to approximately 500 ms in duration for a 1 mm drop. However, it is possible to move beyond the equilibrium position when a voltage pulse of appropriate duration and sufficient amplitude is applied across electrodes 232 and 234. In this case, the distance traversed by the drop 256 may be tens of drop diameters (e.g. a 100 ms pulse of 500 V for a 1 mm droplet on a Teflon surface).

Figure 3:
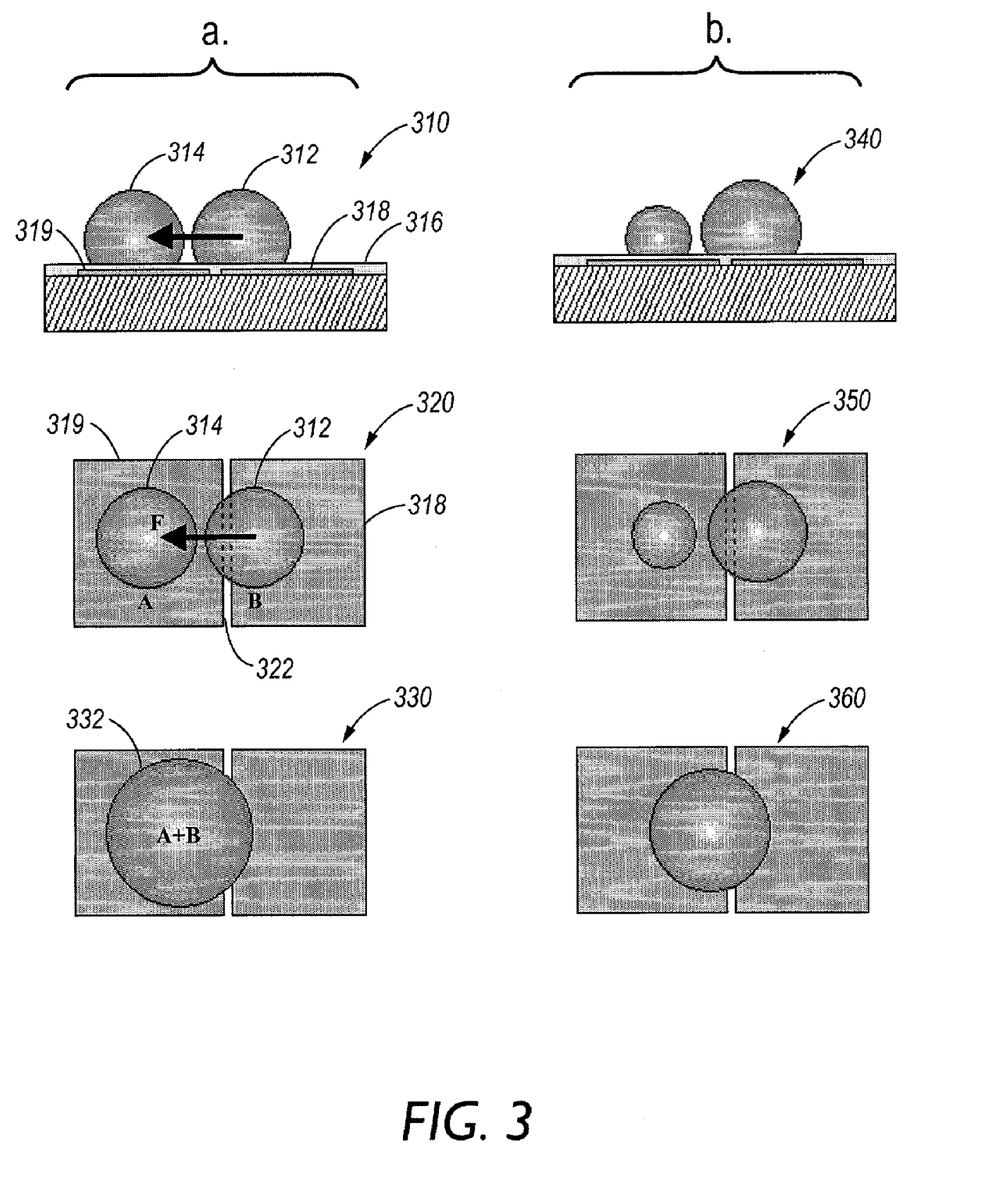
FIG. 3 illustrates drop mixing according to one embodiment of the present invention.

Referring now to FIG. 3, there is illustrated an embodiment of the present invention in which drops 312 and 314 are merged on surface 316 over electrodes 318 and 319. For drop merging, a first drop 312 is placed asymmetrically across gap 322 between electrodes 318 and 319, as shown before, and a second drop 314 is placed in close proximity to the first drop, but on the opposite side of gap 322. For example, for 1 mm diameter droplets and a 50 μm electrode gap, the spacing between the droplets may range from approximately 50μ to approximately 100μ. When a voltage is applied, drop 312 moves towards a centering position, touching and merging with drop 314 to form drop 332. In this configuration, the voltage required across electrodes 318 and 319 may range from a low of approximately 25 V to approximately 100 V when the droplets are spaced approximately 50μ apart. With wider drop spacing, for example, 250 μm or greater, a voltage exceeding 100 V may be required. The present invention significantly reduces merging time requirements for the drops as compared to diffusion. For example, this invention provides drop merging within less than 1 sec for two 1 mm diameter drops, as opposed to time requirements of 10–60 seconds for diffusion processes. Short mixing time is particularly important in assay screening applications, to provide for expeditious screening of multiple samples. Additionally, using drops of substantially dissimilar volume, as shown in illustrations 340, 350 and 360 further decreases mixing times. As will be appreciated by one skilled in the art, drops may also be merged by moving both drops toward each other.

When two drops of equivalent size are brought together they coalesce into a single drop in which very little convective mixing occurs—one side of the combined drop has the liquid from the first drop and the other side of the combined drop has the liquid of the second drop. There is internal fluid motion but the motion tends to be symmetrical within the two sides, not resulting in mixing of the two liquids. Mixing in this case occurs due to diffusion between the two liquids at the boundary between them. If one drop is smaller than the other drop and the two drops are brought together the momentum of the smaller drop will cause a swirling motion in the combined drop. This both increases the internal area over which the diffusion occurs and, depending on relative speed, could create a shearing motion inside the drop which creates internal weak vortices (packets of rotating fluid) which further enhance mixing rates. Alternatively, the smaller drop may be moved forcibly into the larger drop, in which case the smaller drop is sized to be roughly ¼ to ½ the diameter of the larger drop. As the smaller drop's diameter gets smaller, its mass decreases and, for a given velocity, its momentum or kinetic energy also decreases, thus its ability to create a swirling current in the larger drop decreases. Conversely, as the smaller drop diameter becomes larger than roughly ½ the diameter of the larger drop, the difference in diameter becomes smaller and the two drops join more and more like equivalent sized drops—which do not create a shear flow and do not mix as well.

Figure 4:
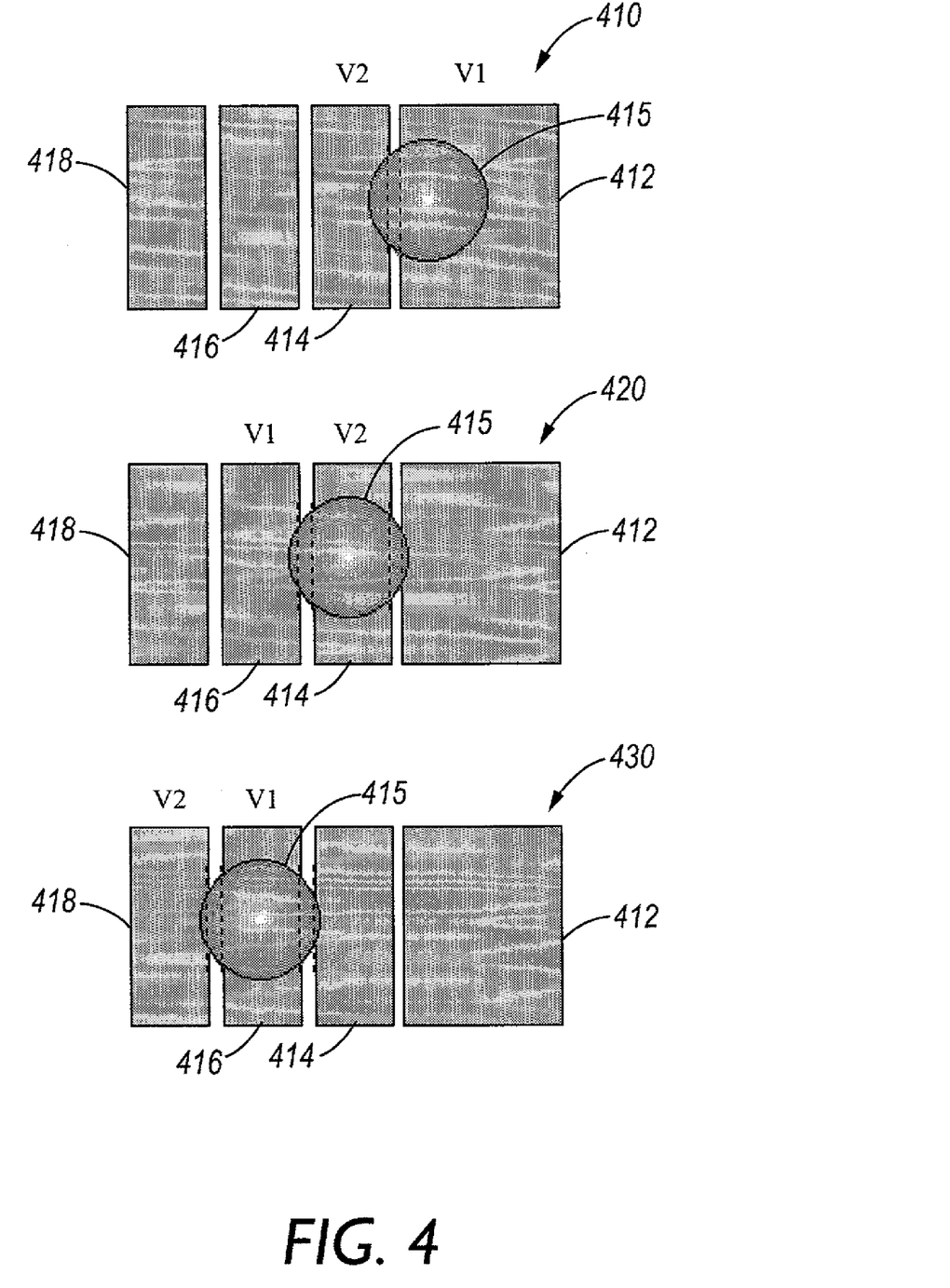
FIG. 4 illustrates drop movement on a drop mover structure according to another embodiment of the present invention.

By spatially repeating the electrode structure shown in FIG. 1, and applying voltage pulses with appropriate sequence and timing, it is possible to move droplets over larger distances, as shown in FIG. 4. At rest position 410, a voltage pulse (V2–V1) is applied between first and second electrodes 412 and 414 respectively, moving droplet 415 toward second electrode 414. In this example, at position 420 droplet 415 moves beyond a first gap between electrodes 412 and 414 to reach a second position asymmetrically over electrode 414 and a second gap between electrode 414 and 416. However, with electrodes narrower than half the drop diameter, it is also possible to achieve asymmetric bridging of 'gap 2' when the droplet is sitting in its equilibrium position across 'gap 1'. Next, a voltage pulse is applied between electrodes 414 and 416, as shown in position 420, causing drop 415 to move such that it is asymmetrically positioned over electrode 416 and a third gap between electrodes 416 and 418, shown as position 430. This procedure is then repeated to move drop 415 across subsequent electrodes and electrode gaps, thus providing one-dimensional drop motion.

Figure 5:
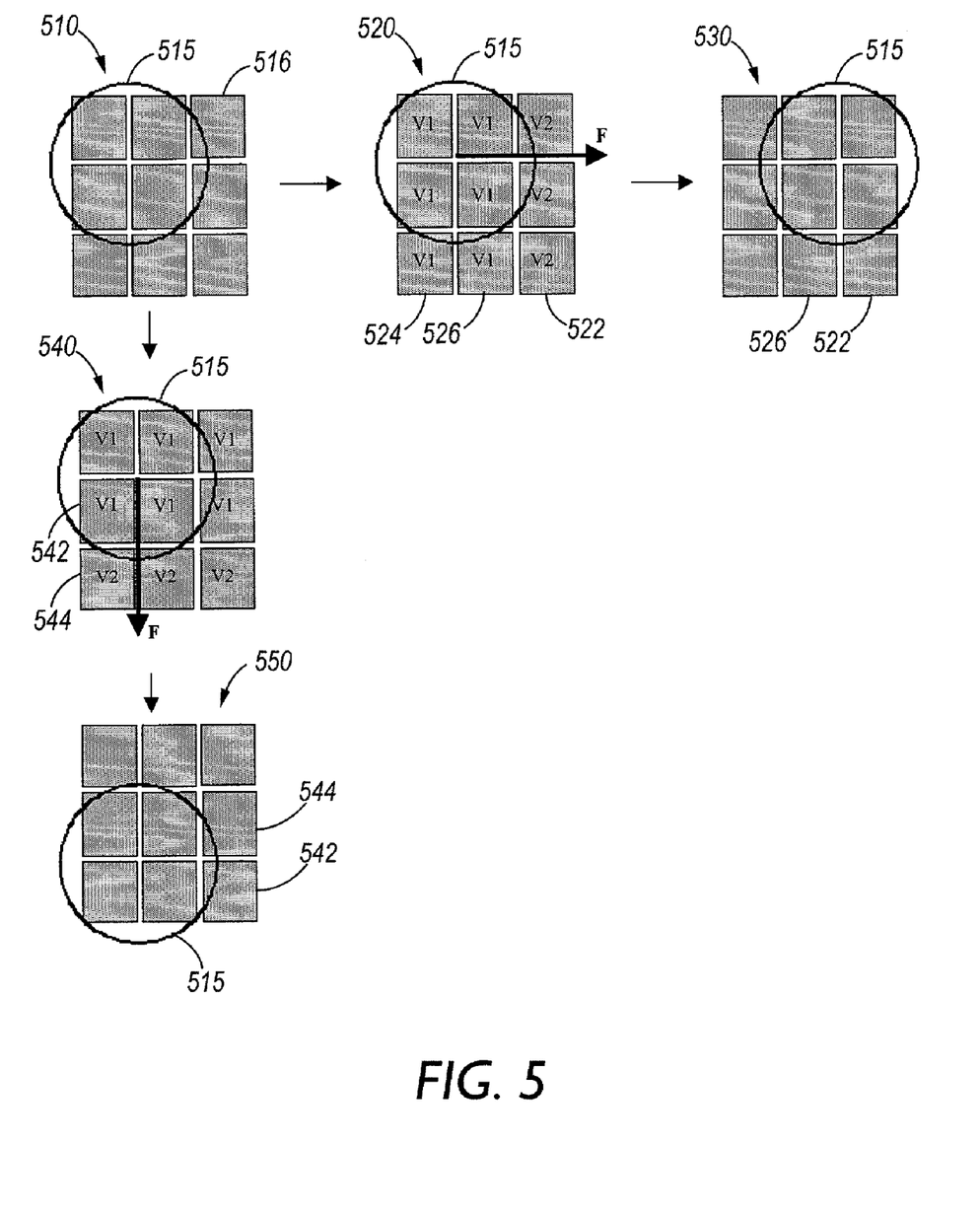
FIG. 5 illustrates drop movement on a drop mover structure according to yet another embodiment of the present invention.

Such drop movement may be extended to two dimensions, as illustrated in FIG. 5. With a series of 'pixelated' electrodes 516, shown in position 510 with drop 515, instead of 'linear' electrodes, it is possible to move droplets across a surface in two dimensions. In this embodiment, at position 520 a voltage pulse is applied between electrode columns 522 and 526, causing drop 515 to move such that it is asymmetrically located across the gap between electrode columns 522 and 526, shown in position 530. Alternatively, in position 540, a voltage pulse is applied between electrode rows 542 and 544, causing drop 515 to move to a position asymmetrically located across the gap between electrode rows 542 and 544, as shown in position 550. It is noted that a drop may be moved according to various embodiments of the present invention such that it is located over electrodes rather than gaps, depending on the drop material, the voltage applied, and the surface traversed by the drop, as will be appreciated by one skilled in the art.

Figure 9:
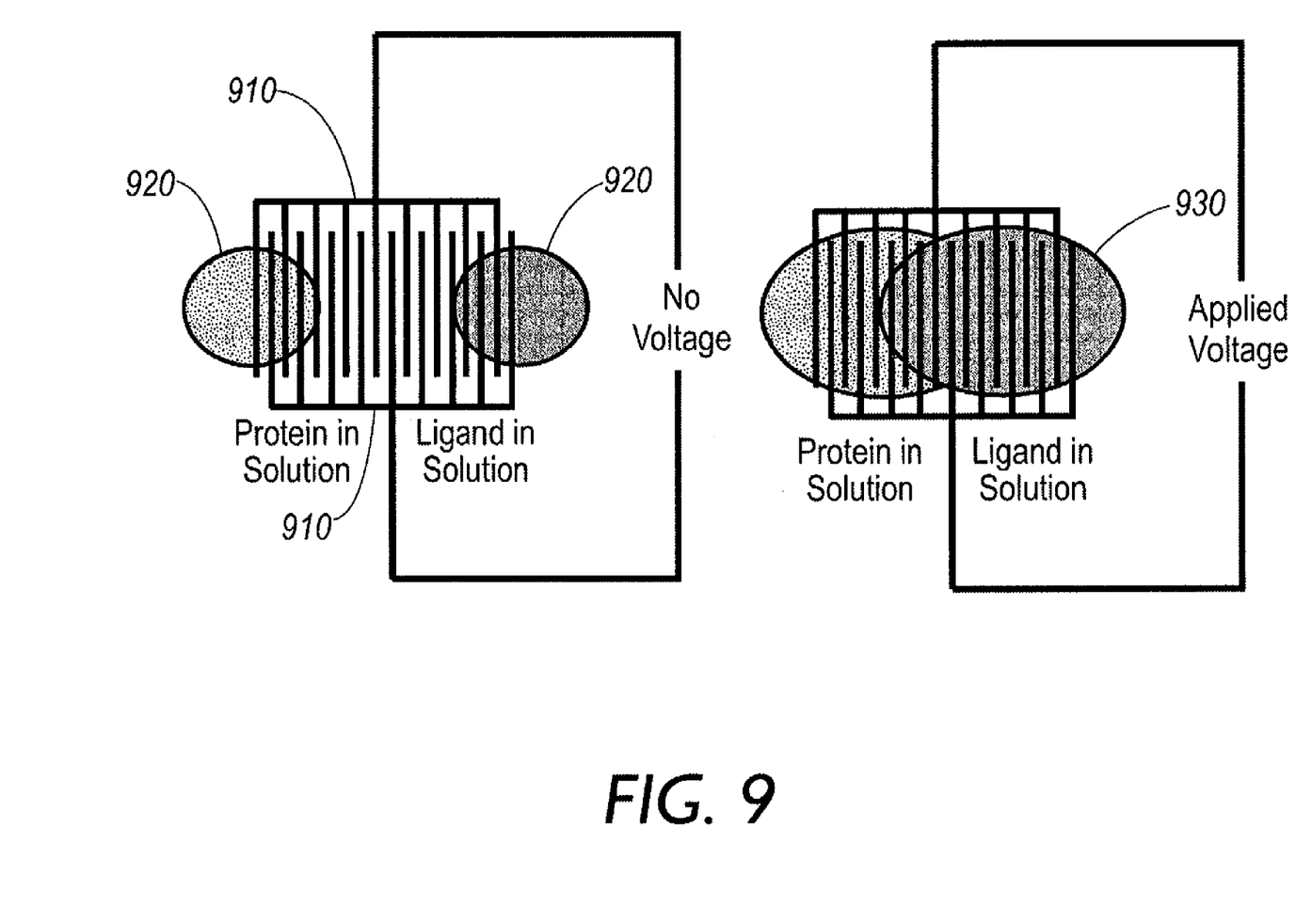
FIG. 9 illustrates yet another embodiment of the drop mover structure according to the present invention.

Referring now to FIG. 9, there is shown yet another embodiment for the movement, deformation and/or merging of microfluidic drops according to the present invention. In FIG. 9, droplets 920 have been deposited by any known means onto a non-conducting substrate that includes a set of patterned, interdigitated electrodes. In one application, droplets 920 are deposited at the edge of the patterned, interdigitated set of electrode fingers 910. A voltage is then applied to electrodes 910, causing the droplets to both move laterally toward the center of the interdigitated region and also flatten, with the result that they merge into a single droplet 930, based on the dielectric body force exerted by the electric field fringes.

In the case of a droplet that is initially placed in the center of the interdigitated electrode zone, the forces will tend to deform (flatten) the drop, but will not introduce any appreciable lateral force. In the case where the drop is a nonconducting dielectric and the electric field therefore penetrates the drop to a significant extent, the dielectric body force per unit volume is given by $$F/V_D = \epsilon \epsilon_0 \nabla E^2,$$

where $\epsilon$ is the dielectric constant, $\epsilon_0$ is permittivity of free space, $V_D$ is the drop volume, and $E$ is the electric field strength Assuming a hemispherical droplet of dimension R and an electrode center-to-center spacing also of dimension R, the droplet volume is of dimension $R^3$, the electric field is of dimension V/R, and the gradient of the square of the electric field in the inter-electrode region is of dimension $(V/R)^2/R$. The resulting dielectric body force on the droplet is on the order of:

$$F = \epsilon \epsilon_0 \nabla E^2 * V_D = \epsilon \epsilon_0 (V/R)^2/R * R^3$$

$$F = \epsilon \epsilon_0 V^2$$

For the case where the drop size is on the same order as the inter-electrode spacing, the force on the droplet is to first order independent of the drop size. For water with a dielectric constant of 80, the force is equal to:

$$F = 0.7 \text{ nanoNewtons} * V^2$$

With an applied voltage of 100V, the approximate force on the droplet is $7 \times 10^{-6}$ Nt.

In order to prevent electrolysis, in the presence of electrically conducting fluids such as an aqueous solution the electrodes are preferably coated with an inert, pinhole-free dielectric layer such as silicon nitride, silicon oxynitride, silicon dioxide, parylene or other organic materials. The dielectric layer has a thickness in the range of 0.2 to 10 microns, where a thinner layer is preferred in order to insure that the voltage drop occurs primarily in the fluid and not in the dielectric layer. The coating additionally inhibits the flow of DC electrical currents, which would otherwise give rise to ohmic heating of the liquid. The outermost layer may be hydrophobic in nature, to ensure that the deposited drops do not spread and merge prior to the application of the voltage. Hydrophobicity can be achieved by using a dielectric layer that is intrinsically hydrophobic, or by coating the dielectric surface with a hydrophobic material such as a fluoropolymer. The dielectric coating is preferably thermally conductive to insure rapid thermal equilibration with the substrate.

While the present invention has been illustrated and described with reference to specific embodiments, further modification and improvements will occur to those skilled in the art. For example, any of the embodiments described herein could provide for movement of two drops toward each other, rather than having one stationary drop and one moving drop. Also combinations of one-dimensional and/or two-dimensional drop mover arrays may be utilized to merge multiple drops originating from different source locations. It is to be understood, therefore, that this invention is not limited to the particular forms illustrated and that it is intended in the appended claims to embrace all alternatives, modifications, and variations which do not depart from the spirit and scope of this invention.

What is claimed is:

1. A method comprising:
  depositing a first liquid droplet and a second liquid droplet on a surface with a spacing between said first liquid droplet and said second liquid droplet;
  applying voltages to a set of two or more electrodes under said surface, said voltages causing one or both said first liquid droplet and said second liquid droplet to deform toward each other across said spacing; in response to said voltages, said deformed droplets contacting each other and merging; and
  wherein said first liquid droplet and said second liquid droplet support ion migration, each of said first and second liquid droplets having an adjacent surface, said adjacent surfaces being oppositely charged resulting from said ion migration responsive to said voltages, and the deformation of said first liquid droplet and said second liquid droplet responsive to an electrostatic force between said adjacent surfaces.

2. The method of claim 1, wherein said surface is disposed on a dielectric layer, wherein said dielectric layer surrounds said electrodes.

3. The method of claim 1, wherein said set of two or more electrodes comprises interdigitated electrode fingers.

4. The method of claim 2, wherein said voltages are provided by no more than two voltage sources.

5. The method of claim 1, wherein said surface comprises a hydrophobic surface.

6. The method of claim 1, wherein said surface comprises an oleophobic surface.

7. The method of claim 1, wherein the electrodes of said set of electrodes are separated by one or more gaps, at least one of said one or more gaps having a gap width between one micrometer to 500 micrometers.

8. The method of claim 1, wherein at least one of said set of electrodes has a size, said electrode size ranging from 10 micrometers to 10 millimeters on each side.

9. The method of claim 1, further comprising at least two voltage connections to said set of electrodes.

10. The method of claim 1, wherein each of said first liquid droplet and said second liquid droplet is smaller in size than said first electrode and said second electrode.

11. The method of claim 1, wherein said first liquid droplet and said second liquid droplet have at least one differing property.

12. The method of claim 1, wherein merging produces a chemical reaction within not less than one merged droplet.

13. The method of claim 1, wherein said first liquid droplet comprises a dielectric fluid and the deformation of said first liquid droplet is responsive to an electrostatic body force acting on said dielectric fluid; said electrostatic body force responsive to an electric field established by said voltages.

14. The method of claim 13, wherein said electric field further comprises a fringe field.

15. The method of claim 14, wherein said set of two or more electrodes are a set of patterned interdigitated electrodes.

* * * * *